(12) United States Patent
Lv et al.

(10) Patent No.: US 11,531,247 B2
(45) Date of Patent: Dec. 20, 2022

(54) DISPLAY MODULE AND ELECTRONIC DEVICE

(71) Applicants: BEIJING BOE DISPLAY TECHNOLOGY CO., LTD., Beijing (CN); BOE TECHNOLOGY GROUP CO., LTD., Beijing (CN)

(72) Inventors: Zhenhua Lv, Beijing (CN); Zhidong Wang, Beijing (CN); Xiaoling Xu, Beijing (CN); Yang You, Beijing (CN); Ning Jia, Beijing (CN); Yun Qiu, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 352 days.

(21) Appl. No.: 16/638,869

(22) PCT Filed: Mar. 15, 2019

(86) PCT No.: PCT/CN2019/078327
§ 371 (c)(1),
(2) Date: Feb. 13, 2020

(87) PCT Pub. No.: WO2019/179367
PCT Pub. Date: Sep. 26, 2019

(65) Prior Publication Data
US 2020/0192175 A1 Jun. 18, 2020

(30) Foreign Application Priority Data

Mar. 19, 2018 (CN) .......................... 201810226059.0

(51) Int. Cl.
*G02F 1/16757* (2019.01)
*G02F 1/1681* (2019.01)

(52) U.S. Cl.
CPC ........ *G02F 1/16757* (2019.01); *G02F 1/1681* (2019.01)

(58) Field of Classification Search
CPC ............. G02F 1/1333; G02F 1/133302; G02F 1/133305; G02F 1/13338; G02F 1/133707;
(Continued)

(56) References Cited

FOREIGN PATENT DOCUMENTS

| CN | 101160547 | 4/2008 |
|---|---|---|
| CN | 103852948 | 6/2014 |

(Continued)

*Primary Examiner* — Brandi N Thomas
(74) *Attorney, Agent, or Firm* — Leason Ellis LLP

(57) ABSTRACT

A display module and an electronic device are provided, the display module including: an upper substrate including a first electrode provided on the substrate, and a plurality of projections provided on a first surface of the upper substrate and arranged in a matrix; a lower substrate including a second electrode provided on the lower substrate, and a plurality of grooves provided on a first surface of the lower substrate; and an inverted emulsion. The first surface of the upper substrate is on the first surface of the lower substrate, each projection matches a groove corresponding thereto to form an accommodating space, and the inverted emulsion is filled in the accommodating space.

18 Claims, 7 Drawing Sheets

(58) Field of Classification Search
CPC ............. G02F 1/133753; G02F 1/1345; G02F 1/1393; G02F 1/133351; G02F 1/133377; G02F 1/1334; G02F 1/13363; G02F 1/133757; G02F 1/133776; G02F 1/1339; G02F 1/1343; G02F 1/134318; G02F 1/1347; G02F 1/167; G02F 1/1676; G02F 1/1679; G02F 1/1681; H01L 2924/0002; H01L 2224/48091; H01L 27/15; H01L 27/3276; H01L 2933/0041; H01L 2933/005; H01L 2933/0066; H01L 33/0066; H01L 33/0075; H01L 33/0093; H01L 33/38; H01L 33/44; H01L 33/48; H01L 33/486; H01L 33/50; H01L 33/62; H01L 51/524; H01L 2224/16; H01L 2224/73265; H01L 27/3246; H01L 51/0097; H01L 51/52; H01L 51/5256; H01L 27/3223; H01L 2924/01078; H01L 2924/15311; H01L 2924/3025; H01L 31/14; H01L 51/0005; H01L 51/50; H01L 51/5246; H01L 51/5253; H01L 21/6835; H01L 2221/68345; H01L 2221/68363; H01L 2224/023; H01L 2224/05001; H01L 2224/05026; H01L 2224/05172; H01L 2224/05184; H01L 2224/05571; H01L 2224/056; H01L 2224/16225; H01L 2224/16235; H01L 2224/274; H01L 2224/29082; H01L 2224/32225; H01L 2224/32257; H01L 2224/45124; H01L 2224/45144; H01L 2224/48257; H01L 2224/48465; H01L 2224/73104; H01L 2224/73204; H01L 23/50; H01L 23/642; H01L 24/05; H01L 24/27; H01L 27/3244; H01L 29/41733; H01L 29/42384; H01L 29/78603; H01L 2924/00; H01L 2924/01019; H01L 2924/01046; H01L 2924/01068; H01L 2924/01079; H01L 2924/12044; H01L 2924/15174; H01L 2924/181; H01L 2924/19041; H01L 2924/30107; H01L 2924/3011; H01L 35/30; H01L 51/00; H01L 51/56

See application file for complete search history.

(56) References Cited

FOREIGN PATENT DOCUMENTS

| | | | | |
|---|---|---|---|---|
| CN | 105264422 | | 1/2016 | |
| CN | 105474085 | * | 4/2016 | ............ G02F 1/167 |
| CN | 105579900 | | 5/2016 | |
| CN | 106154678 | | 11/2016 | |
| CN | 106681063 | | 5/2017 | |
| CN | 107632480 | | 1/2018 | |
| CN | 108445690 | | 8/2018 | |
| JP | 201602117 | * | 1/2016 | ............ G03B 21/62 |
| WO | 2009129112 | | 10/2009 | |

\* cited by examiner

DISPLAY MODULE AND ELECTRONIC DEVICE

CROSS-REFERENCE TO RELATED APPLICATION

The application is a U.S. National Stage Application under 35 U.S.C. § 371 of International Patent Application No. PCT/CN2019/078327, filed Mar. 15, 2019, which claims the benefit of priority to Chinese patent application No. 201810226059.0, entitled "Display Module and Electronic Device", filed with CNIPA on Mar. 19, 2018, both of which are incorporated by reference in their entireties.

TECHNICAL FIELD

Embodiments of the present disclosure relate to a display module and an electronic device.

BACKGROUND

An electronic ink screen has two substrates, and electronic ink including countless tiny transparent particles is coated between the substrates. The particles are formed by sealing many black and white particles with positive and negative charges in internal liquid microcapsules. The charged particles in different colors will move in different directions due to different applied electric fields, showing a black or white effect on a surface of a display screen; and the display of the electronic ink screen is implemented by light reflection of the charged particles, and an image may be displayed continuously without continuous power supply.

SUMMARY

Embodiments of the present disclosure provide a display module and an electronic device.

At least one embodiment of the present disclosure provides a display module, comprising: an upper substrate comprising a first electrode provided thereon, and a plurality of protrusions arranged in a matrix at the first surface of the upper substrate; a lower substrate comprising a second electrode provided thereon, and a plurality of grooves arranged at the first surface of the lower substrate; and an inverted emulsion. The first surface of the upper substrate is on the first surface of the lower substrate, and each of the protrusions is cooperated with a corresponding groove to form an accommodation space, and the inverted emulsion is filled in the accommodation space.

For example, each protrusion is a circular-arc protrusion, each groove is a circular-arc groove, and the circular-arc protrusion and the circular-arc groove are arranged concentrically to form the accommodation space.

For example, each circular-arc protrusion is a hemispherical protrusion, each circular-arc groove is a hemispherical groove, and the hemispherical protrusion and the hemispherical groove are arranged concentrically to form the accommodation space.

For example, each hemispherical protrusion has a diameter of about 10 to 30 micrometers; and a distance from a surface of the hemispherical protrusion to a surface of the hemispherical groove is about 2 to 5 micrometers.

For example, each hemispherical protrusion has a diameter of about 20 micrometers.

For example, the upper substrate comprises a glass plate layer and a first resin layer, the circular-arc protrusions are provided on a surface of the first resin layer and are an integral structure with the first resin layer; and the lower substrate comprises a non-transparent substrate layer and a second resin layer, the circular-arc grooves are provided at the surface of the second resin layer and are an integral structure with the second resin layer.

For example, refractive indexes of the charged particles in the inverted emulsion, the first resin layer, and the uncharged liquid in the inverted emulsion are decreased sequentially.

For example, the second resin layer has a thickness of about 10 to 30 micrometers.

For example, the second resin layer has a thickness of about 20 micrometers.

For example, a liquid storage tank is provided at a bottom of each circular-arc groove.

For example, a first electrode is provided in each of the circular-arc protrusions; and a second electrode is provided in a bottom of each of the liquid storage tanks.

For example, two adjacent liquid storage tanks are communicated with each other.

For example, the plurality of accommodation spaces are communicated at the first surface of the lower substrate; and the bottoms of the plurality of circular-arc grooves are communicated with each other.

For example, the plurality of accommodation spaces are spaced apart from each other.

At least one embodiment also provides an electronic device, comprising the display module.

DETAILED DESCRIPTION

Technical solutions of the embodiments will be described in a clearly and fully understandable way in connection with the drawings related to the embodiments of the disclosure. It is apparent that the described embodiments are a part but not all of the embodiments of the disclosure. Based on the described embodiments herein, one of ordinary skill in the art can obtain other embodiment(s), without any creative work, which shall be within the scope of the disclosure.

Unless otherwise defined, all the technical and scientific terms used herein have the same meanings as commonly understood by one of ordinary skill in the art to which the present disclosure belongs. The terms, such as 'first,' 'second,' or the like, which are used in the description and the claims of the present disclosure, are not intended to indicate any sequence, amount or importance, but for distinguishing various components. The terms, such as 'comprise/comprising,' 'include/including,' or the like are intended to specify that the elements or the objects stated before these terms encompass the elements or the objects and equivalents thereof listed after these terms, but not preclude other elements or objects. The terms, 'on,' 'under,' or the like are only used to indicate relative position relationship, and when the absolute position of the object which is described is changed, the relative position relationship may be changed accordingly The inventor noticed that the electronic ink particles of the existing electronic ink screen tend to aggregate and have long response time when they move under the action of an electrode, which, therefore, limits the application of the electronic ink display technologies, and the existing electronic ink screen cannot be used in a high-end electronic device.

Figure 1:
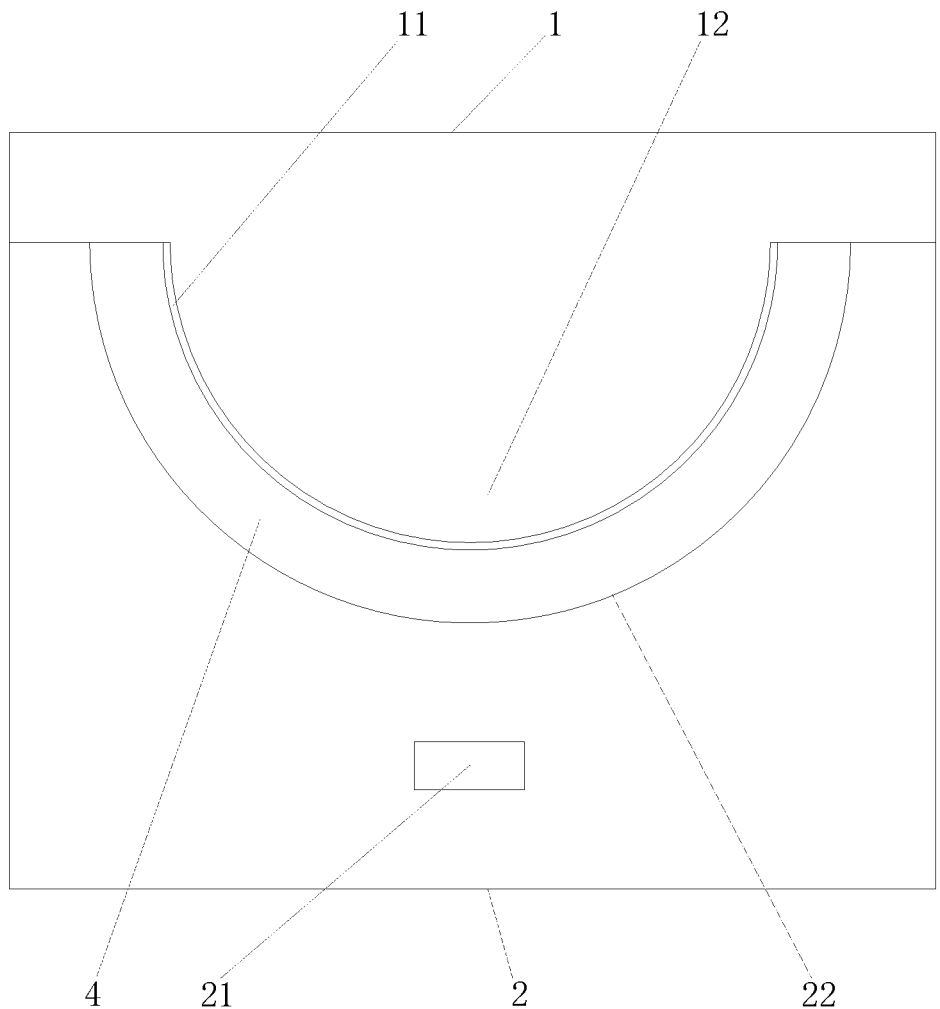
FIG. 1 is a schematically structural diagram of a display module which is not filled with an inverted emulsion according to an embodiment of the present disclosure.
Figure 2:
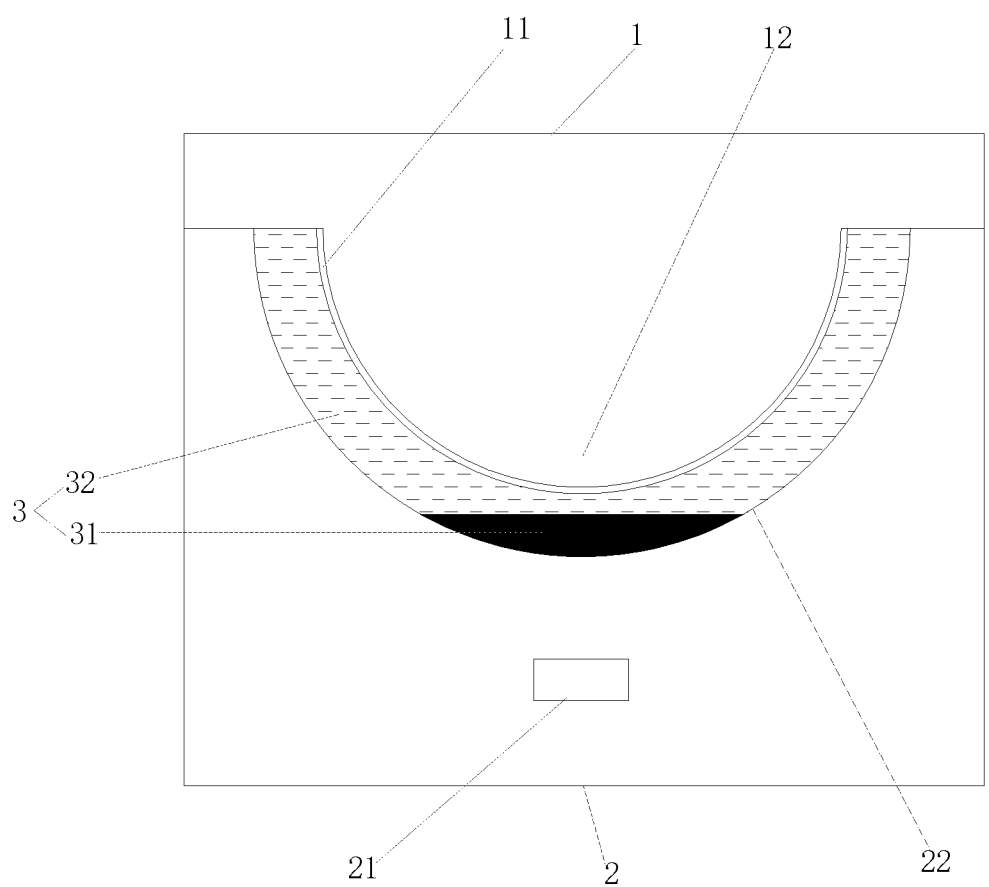
FIG. 2 is a schematically structural diagram of a display module in a bright state according to an embodiment of the present disclosure.
Figure 3:
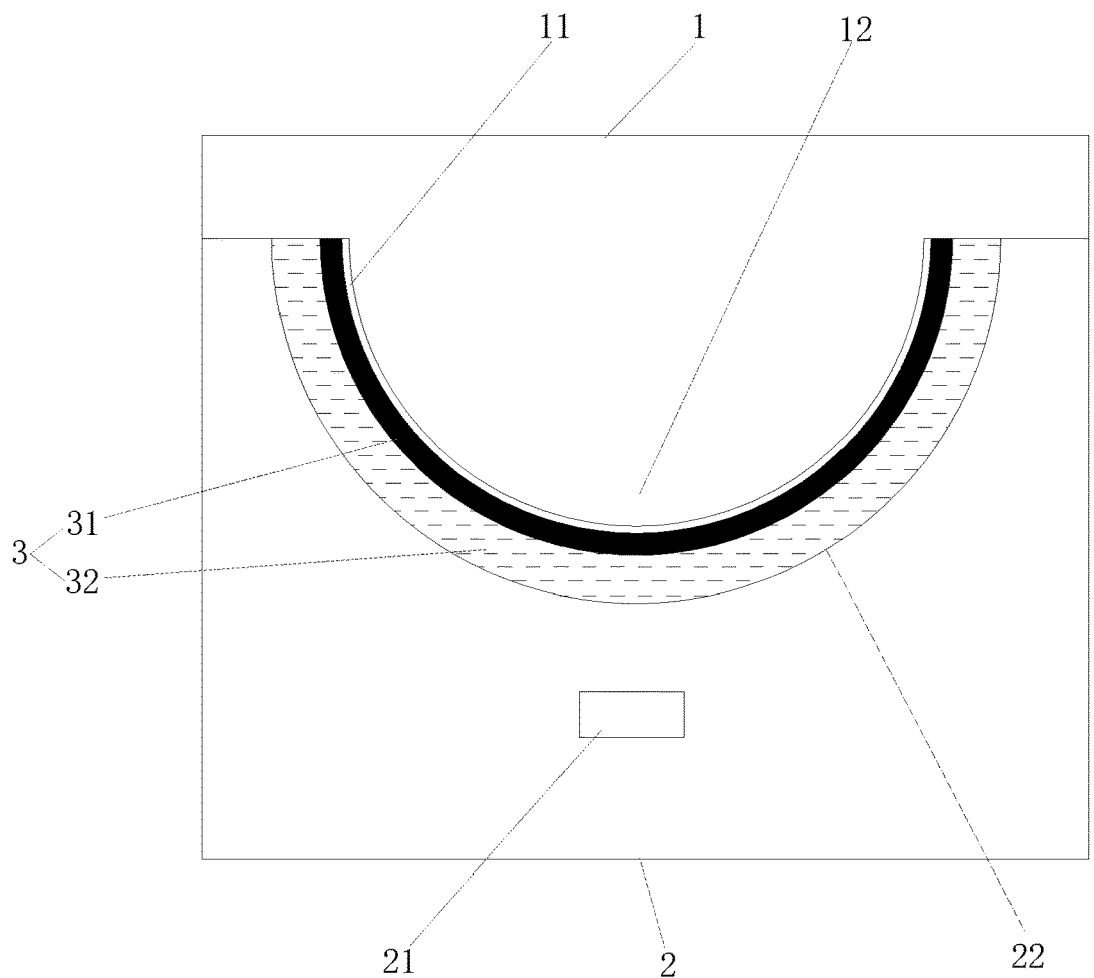
FIG. 3 is a schematically structural diagram of a display module in a dark state according to an embodiment of the present disclosure.

As shown in FIGS. 1 to 3, an embodiment of the present disclosure provides a display module including: an upper substrate 1, a lower substrate 2, and an inverted emulsion 3. The upper substrate 1 is provided with a first electrode 11, a first surface of the upper substrate 1 is provided with a plurality of protrusions 12 arranged in a matrix. The lower substrate 2 is provided with a second electrode 21, and a first surface of the lower substrate 2 is provided with a plurality of grooves 22 arranged in a matrix. The first surface of the upper substrate 1 is on the first surface of the lower substrate 2, and each of the protrusions 12 is cooperated with one of the grooves 22 to form an accommodation space 4, and the inverted emulsion 3 is filled in the accommodation space 4.

For example, the first electrode 11 is disposed at a front surface of the protrusion 12 and faces the lower substrate 2.

For example, the protrusions and the grooves may be circular-arc-shaped, and are cooperated with each other to form the accommodation space similar to a partial circular-arc body.

The display module according to the embodiments of the present disclosure has similar display principles to an electronic ink display module, both relating to the reflective display technology.

For example, the upper substrate is configured as a side plate forming a cavity which accommodates the inverted emulsion and used as a side electrode. That is, the upper substrate is required to be provided with the same number of electrodes as the circular-arc protrusions at its first surface. The upper substrate may be made of a transparent insulating material, such as a resin material or glass. For example, the upper substrate may further be provided with protective glass at a second surface opposite to the first surface thereof. For example, a thickness and a structural dimension of the upper substrate may be made depending on the design and use requirements. For example, the plurality of circular-arc protrusions at the first surface of the upper substrate are arranged in a matrix. The distance between two adjacent circular-arc protrusions may be made according to the process and design requirements, for example, it is about 4 to 10 micrometers. For example, each of the circular-arc protrusions may be a hemispherical protrusion, or a protrusion smaller than a half-sphere, or an arc-shaped protrusion similar to a sphere. But it should be noted that the surface of each circular-arc protrusion is smooth without a rough surface. The lower substrate is configured as another side plate forming the cavity which accommodates the inverted emulsion, and also used as a side electrode, i.e., the lower substrate is provided with the same number of electrodes as the circular-arc grooves. For example, the lower substrate is made of a non-transparent material, and the portion of the lower substrate configured to make the circular-arc grooves may be made of a transparent resin material, while the portion of the substrate for carrying is made of a non-transparent material, such as a printed circuit board. The shape of the circular-arc grooves provided at the first surface of the lower substrate is matched with the shape of the circular-arc protrusions, so that the cooperated accommodation space is similar to a partial circular-arc body, so as to reduce a movement distance when the charged particles are displaying and to increase the display response speed. For example, the distribution positions of the circular-arc grooves provided at the first surface of the lower substrate and the distance between two adjacent circular-arc grooves are matched with those of the circular-arc protrusions, so that the circular-arc grooves are cooperated with the circular-arc protrusions well when the upper substrate is assembled with the lower substrate.

As shown in FIGS. 2-3 and FIGS. 6-7, the inverted emulsion 3 is a suspended milky liquid formed by uniformly mixing a large number of tiny charged particles 31 or charged droplets with transparent uncharged liquid 32. For the display module according to the embodiment of the present disclosure to display normally, the refractive index of the charged particles in the inverted emulsion 3 is greater than the refractive index of the uncharged liquid, and the refractive index of the uncharged liquid is greater than the refractive index of the upper substrate. For example, the type and size of the charged particles 31 in the inverted emulsion 3 may be set with reference to a prior art, and the uncharged liquid 32 may also be set according to application needs and the technique in the art.

Referring to FIGS. 2 and 3, the principle of the embodiment of the present disclosure is explained as follows. When the charged particles 31 of the inverted emulsion 3 are negatively charged, a positive voltage is applied to the first electrode 11 of the upper substrate 1, the charged particles 31 are uniformly dispersed at the surface of the circular-arc protrusion 12, rays of the light is absorbed by the charged particles 31, the display module displays in the dark state; a positive voltage is applied to the second electrode 21 of the lower substrate 2, the charged particles 31 are gathered at the bottoms of the circular-arc grooves 22, at this point, the circular-arc protrusions 12 can totally reflect the rays of the light, and the display module displays in the bright state.

In the embodiment of the present disclosure, the display module includes the upper substrate, the lower substrate, and the inverted emulsion. The display module is a reflective display component, the charged particles for the reflective display are provided by the inverted emulsion, and the inverted emulsion is filled in the plurality of accommodation spaces formed between the upper and lower substrates. The display module according to the embodiment of the present disclosure may control the charged particles in the inverted emulsion to move by controlling the electrodes provided in the upper and lower substrates, and implement the reflective display in the dark state and the bright state by attaching the charged particles to the surface of the circular-arc protrusion of the upper substrate and driving the charged particles to move away from the surface of the circular-arc protrusions. Because the charged particles in the inverted emulsion are located in the uncharged liquid of the inverted emulsion, the charged particles are moved under the lubrication and dispersion of the uncharged liquid, so that it prevents the charged particles from being aggregated, the display function is ensured to be normal, and a reflective display effect is good. For example, the plurality of accommodation spaces, each of which has a circular-arc body, formed by matching the circular-arc protrusions at the surface of the upper substrate with the circular-arc grooves at the surface of the lower substrate, are spaced apart by a given distance. That is, the circular-arc protrusions at the surface of the upper substrate are no longer a structure formed by connecting the plurality of protrusions, which avoid sharp corner structures at the positions where the protrusions are connected, and prevent the charged particles from aggregating in the sharp corner structures, and ensuring the display effect of the display module. In addition, the inverted emulsion is located in the accommodation spaces formed by cooperating the circular-arc protrusion and the circular-arc groove. That is, the movement distance of the charged particles in the inverted emulsion is the distance from the surface of the circular-arc grooves to the surface of the circular-arc protrusions. Compared with the charged particles in the electronic ink screen in the art, the movement distance is greatly reduced, which can effectively increase the display response speed of the display module according to the embodiments of the present disclosure and bring a better user experience.

As shown in FIG. 1, for example, each of the circular-arc protrusions 12 are hemispherical protrusions, and each of the circular-arc grooves 22 is a hemispherical groove. The hemispherical protrusions and the hemispherical grooves are arranged concentrically, respectively.

For example, the cooperation of the hemispherical protrusions and the hemispherical grooves enables the accommodation spaces to be similar to the partial spherical surfaces, so that the movement distance of the charged particles in the inverted emulsion decreases; meanwhile, each hemispherical protrusion has smooth surface and uniform radian, each hemispherical groove also has smooth surface and uniform radian; when the charged particles in the inverted emulsion are distributed at the surface of the hemispherical protrusions, the distribution of the charged particles is more uniform, which makes the reflective display effect better. In addition, the production techniques of the hemispherical protrusions and the hemispherical grooves are simple, which can reduce the production costs.

Further, for example, each of the hemispherical protrusions has a diameter of about 10 to 30 micrometers, and the distance from the surface of each of the hemispherical protrusions to the surface of the corresponding hemispherical groove is about 2 to 5 micrometers. For example, the hemispherical protrusion has a diameter of 20 micrometers.

The above-mentioned dimensions are merely a group of exemplary embodiments, and the embodiments of the present disclosure are not limited thereto. For example, the dimensions may be adjusted according to the requirements of the electronic device for the performance of the display module.

Figure 5:
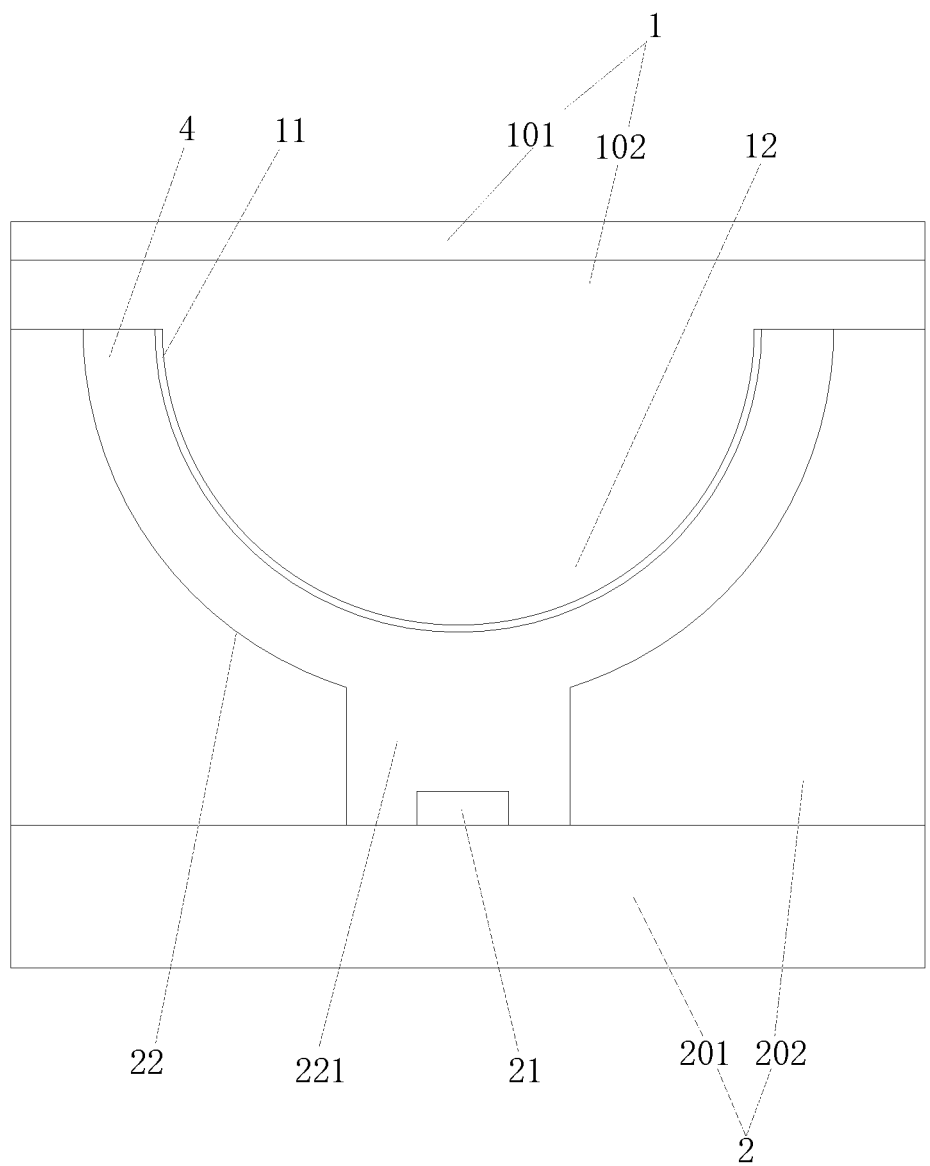
FIG. 5 is a schematically structural diagram of another display module which is not filled with an inverted emulsion according to an embodiment of the present disclosure.
Figure 6:
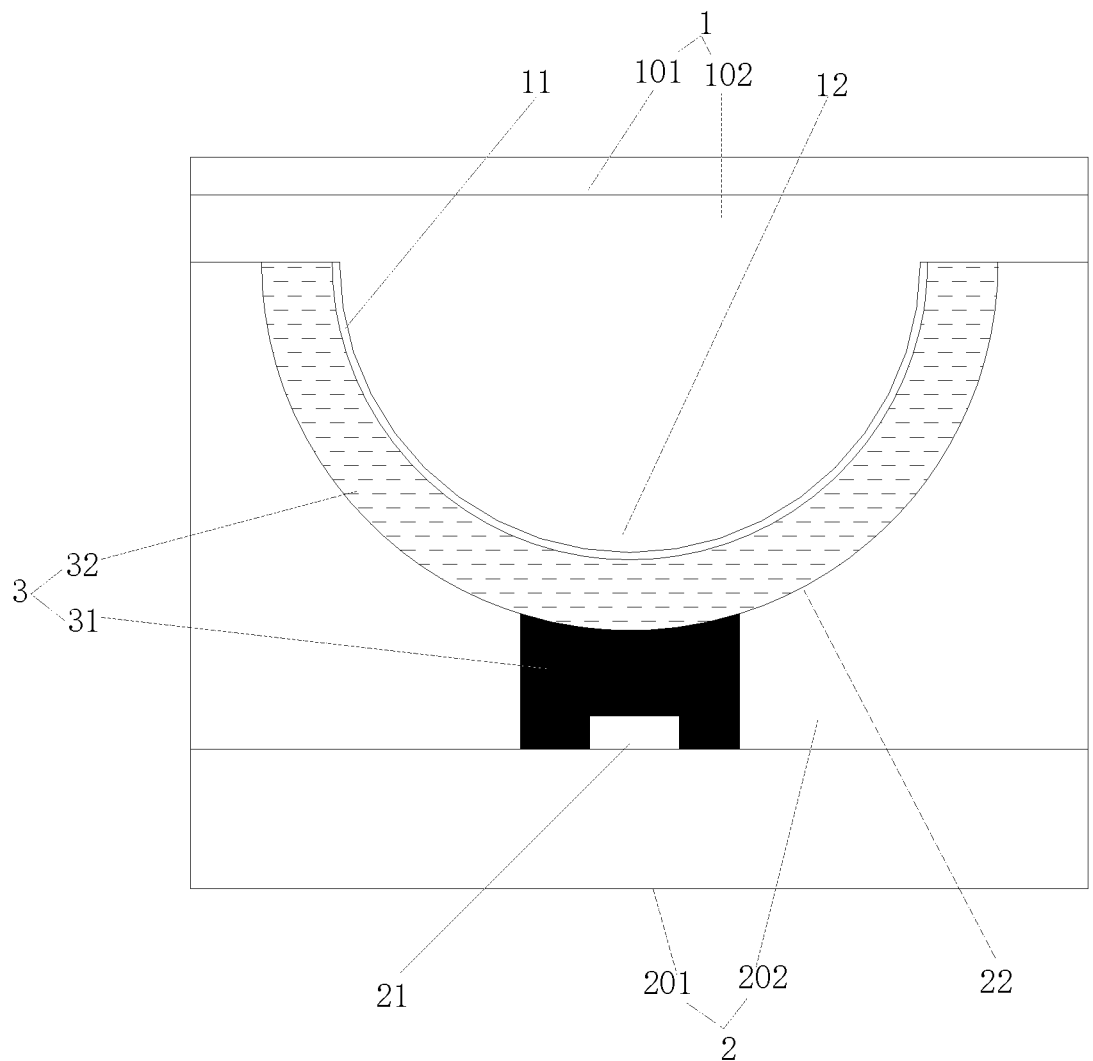
FIG. 6 is a schematically structural diagram of another display module in a bright state according to an embodiment of the present disclosure.
Figure 7:
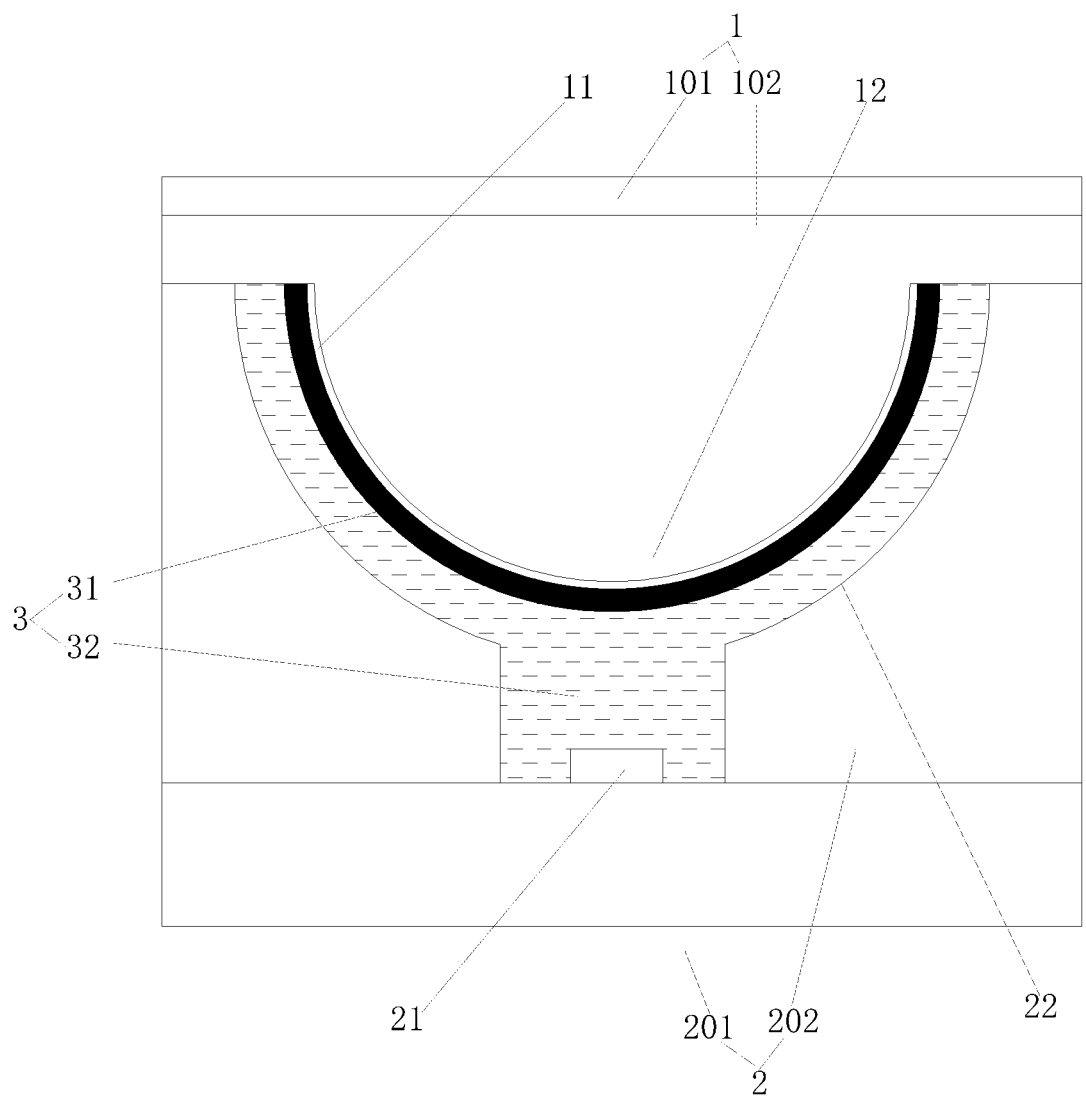
FIG. 7 is a schematically structural diagram of another display module in a dark state according to an embodiment of the present disclosure.

As shown in FIGS. 5-7, for example, the upper substrate 1 includes a transparent substrate layer 101 and a first resin layer 102; the circular-arc protrusions 12 are provided at the surface of the first resin layer 102, and are formed as an integral structure with the first resin layer 102; the lower substrate 2 includes a non-transparent substrate layer 201 and a second resin layer 202; the circular-arc grooves 22 are provided in the second resin layer 202, and are formed as an integral structure with the second resin layer 202. For example, the transparent substrate layer may be a transparent material layer, such as glass or plastic.

It is to be noted that the refractive indexes of the charged particles in the inverted emulsion, the first resin layer, and the uncharged liquid in the inverted emulsion are decreased sequentially, so that when the charged particles are uniformly dispersed at the surfaces of the circular-arc protrusions, the rays of light may be absorbed by the charged particles, and not reflected by the first resin layer to occur bright state display; and so that when the charged particles are aggregated at the bottoms of the circular-arc grooves, the circular-arc protrusions may totally reflect the rays of light, and the display module displays in the bright state.

As shown in FIG. 5, further, according to the exemplary embodiment of the present disclosure, a thickness of the second resin layer 202 is required to be between about 10 to 30 micrometers; for example, the thickness of the second resin layer 202 is about 20 micrometers.

For example, the thickness of the above-mentioned second resin layer is matched with the circular-arc protrusions at the surface of the first resin layer to form the accommodation spaces after the upper substrate is assembled with the lower substrate; at the same time, the affecting on the reflective display is avoided due to the overlarge thickness of the second resin layer.

As shown in FIGS. 5-7, for example, a liquid storage tank 221 is provided at the bottom of each circular-arc groove 22.

For example, when display is not performed, i.e., when the charged particles are not driven by the electrode, the inverted emulsion is concentrated at the bottom of each circular-arc groove, so the liquid storage tank provided at the bottom of each circular-arc groove can be configured to store the inverted emulsion, especially the charged particles stored in the inverted emulsion.

As shown in FIGS. 1 and 5, further, for example, to accurately drive the charged particles in the inverted emulsion in each of the accommodation spaces 4, a first electrode 11 may be provided in each of the circular-arc protrusions 12, and a second electrode 21 is provided at the bottom of each of the liquid storage tanks 221.

Figure 8:
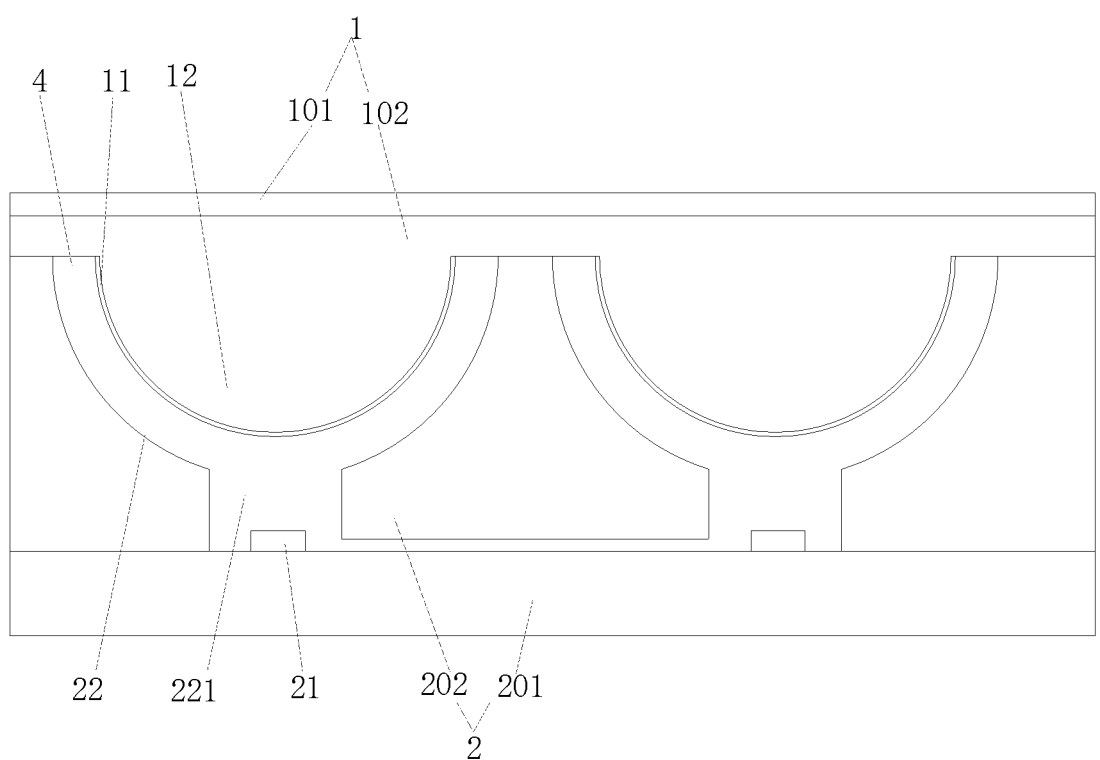
FIG. 8 is a schematically structural diagram of two communicated adjacent accommodation spaces when another display module is not filled with an inverted emulsion according to an embodiment of the present disclosure.

As shown in FIG. 8, for example, two adjacent liquid storage tanks 221 may be communicated with each other, so that the inverted emulsion in each liquid storage tank 211 may be mutually supplemented, the fluidity of the inverted emulsion in the accommodation spaces 4 is increased and the display module has a better display effect.

Figure 4:
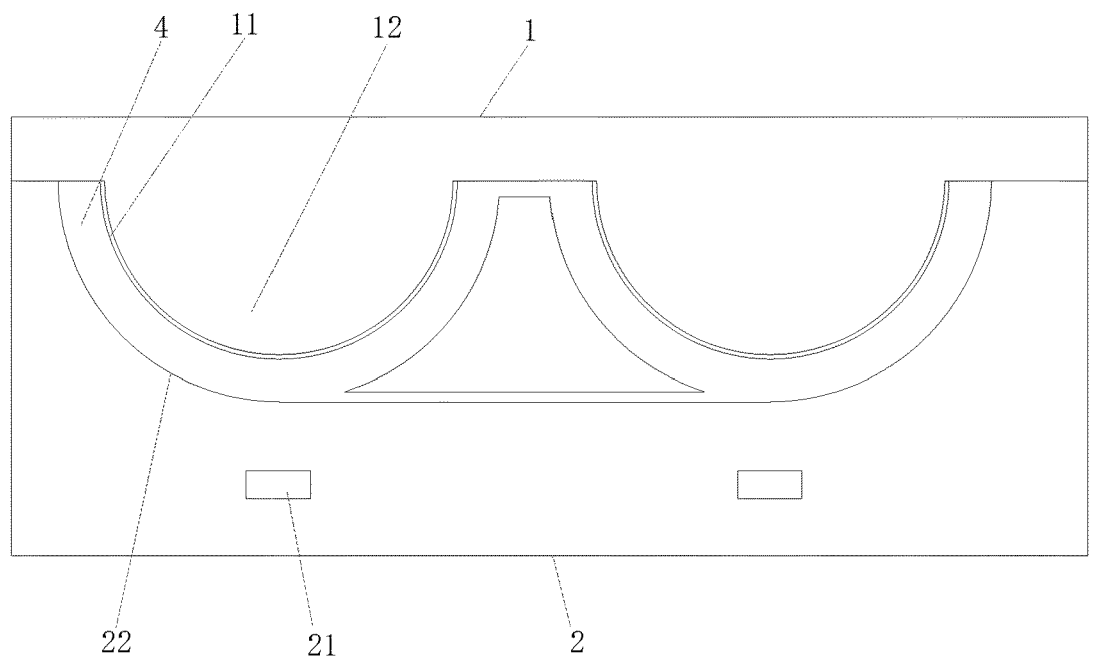
FIG. 4 is a schematically structural diagram of two communicated adjacent accommodation spaces when a display module is not filled with an inverted emulsion according to an embodiment of the present disclosure.

As shown in FIG. 4, in an alternative embodiment, the plurality of accommodation spaces 4 are communicated with each other at the first surface of the lower substrate 2; and the plurality of circular-arc grooves 22 are communicated with each other at the bottoms of the grooves.

For example, as shown in FIG. 4, no liquid storage tank may be provided at the bottom of each circular-arc groove, but the upper and lower portions of the two adjacent accommodation spaces are communicated with each other, so that the inverted emulsion has good fluidity. For example, a communicating channel of each of the plurality of accommodation spaces at the first surface of the lower substrate may be about 1 to 2 micrometers.

An embodiment of the present disclosure also provides an electronic device including the display module. As shown in FIGS. 1-3, the display module includes the upper substrate 1, the lower substrate 2, and the inverted emulsion 3. The upper substrate 1 is provided with the first electrode 11, the first surface of the upper substrate 1 is provided with a plurality of circular-arc protrusions 12 arranged in a matrix;

the lower substrate 2 is provided with the second electrode 21, and the first surface of the lower substrate 2 is provided with a plurality of circular-arc grooves 22 arranged in a matrix; the first surface of the upper substrate 1 is on the first surface of the lower substrate 2, and each of the circular-arc protrusions 12 is cooperated with a corresponding one of the circular-arc grooves 22 to form the accommodation space 4, and the inverted emulsion 3 is filled in the accommodation spaces 4.

The electronic device may be any display device having a display function, for example, any product or component with the display function, such as electronic paper, mobile phone, tablet computer, television, display, notebook computer, digital photo frame, navigator, or the like.

For example, the first electrode 11 is provided at the front surface of the protrusion 12 and faces the lower substrate 2.

For example, for the display module according to the present embodiment, the display module according to the above-mentioned embodiments may be used directly, and the implementation structure may refer to the related contents described in the above-mentioned embodiments, and which are not repeated herein.

In the embodiment of the present disclosure, the display module includes the upper substrate, the lower substrate, and the inverted emulsion, and the inverted emulsion is filled in the plurality of accommodation spaces formed between the upper and lower substrates. In this way, the formed structure may be used as a reflective display component, and the charged particles for the reflective display are provided by the inverted emulsion. The display module according to the embodiments of the present disclosure may control the charged particles in the inverted emulsion to move by controlling the electrodes provided in the upper and lower substrates, and implement the reflective display in the dark state and the bright state by attaching the charged particles to the surfaces of the circular-arc protrusions of the upper substrate and driving the charged particles to move away from the surfaces of the circular-arc protrusions. Because the charged particles in the inverted emulsion are located in the uncharged liquid of the inverted emulsion, the charged particles are moved under the lubrication and dispersion of the uncharged liquid, in this way, it prevents the charged particles from being aggregated, the display function is ensured to be normal, and the reflective display effect is good; and, the plurality of accommodation spaces formed by matching the circular-arc protrusions at the surface of the upper substrate with the circular-arc grooves at the surface of the lower substrate are spaced apart from each other, so that the circular-arc protrusions at the surface of the upper substrate is no longer a protrusion structure formed by connecting the plurality of protrusions, which avoids sharp corner structures at the positions where the protrusions are connected, and prevents the charged particles from aggregating in the sharp corner structures, and obtains the required display effect of the display module. In addition, the inverted emulsion is located in each accommodation space which is a partial circular-arc body, formed by the cooperation of each circular-arc protrusion and a corresponding circular-arc groove. That is, the movement distance of the charged particles in the inverted emulsion is the distance from the surface of the circular-arc groove to the surface of the circular-arc protrusion. Compared with the charged particles in the electronic ink screen in the art, the movement distance is greatly decreased, which can effectively increase the display response speed of the display module according to the embodiments of the present disclosure and bring a better user experience.

The following statements should be noted:

(1) The accompanying drawings involve only the structure(s) in connection with the embodiment(s) of the present disclosure, and other structure(s) can be referred to common design(s).

(2) For the purpose of clarity only, in the accompanying drawings for illustrating the embodiment(s) of the present disclosure, the thickness of a layer or a region may be enlarged or reduced, that is to say, the figures are not drawn according to the actual scale.

(3) Without conflicting with each other, the embodiments of the present disclosure and elements in the embodiments can be combined to obtain new embodiments, and these new embodiments shall fall within the scope of the present disclosure.

The description above is only exemplary embodiments of the present disclosure, and the scope of the present disclosure is not limited thereto. Any changes or substitutions readily conceived by one of ordinary skill in the art without departing the technical scope of the present embodiments, shall fall within the scope of the present disclosure.

What is claimed is:

1. A display module, comprising,
an upper substrate comprising a glass plate layer, a first resin layer, a first electrode, and a plurality of protrusions arranged in a matrix at a first surface of the upper substrate;
a lower substrate comprising a second electrode provided thereon, and a plurality of grooves arranged at the first surface of the lower substrate; and
an inverted emulsion includes charged particles and uncharged liquid;
wherein the first surface of the upper substrate is on the first surface of the lower substrate, and each of the protrusions is cooperated with a corresponding groove to form an accommodation space, and the inverted emulsion is filled in the accommodation space; and
refractive indexes of the charged particles in the inverted emulsion, the first resin layer, and the uncharged liquid in the inverted emulsion are decreased sequentially.

2. The display module according to claim 1, wherein each protrusion is a circular-arc protrusion, each groove is a circular-arc groove, and the circular-arc protrusion and the circular-arc groove are arranged concentrically to form the accommodation space.

3. The display module according to claim 2, wherein each circular-arc protrusion is a hemispherical protrusion, each circular-arc groove is a hemispherical groove, and the hemispherical protrusion and the hemispherical groove are arranged concentrically to form the accommodation space.

4. The display module according to claim 3, wherein each hemispherical protrusion has a diameter of about 10 to 30 micrometers; and a distance from a surface of the hemispherical protrusion to a surface of the hemispherical groove is about 2 to 5 micrometers.

5. The display module according to claim 3, wherein each hemispherical protrusion has a diameter of about 20 micrometers.

6. The display module according to claim 3, wherein the circular-arc protrusions are provided on a surface of the first resin layer and are an integral structure with the first resin layer; and
the lower substrate comprises a non-transparent substrate layer and a second resin layer, the circular-arc grooves are provided at the surface of the second resin layer and are an integral structure with the second resin layer.

7. The display module according to claim 6, wherein the second resin layer has a thickness of about 10 to 30 micrometers.

8. The display module according to claim 6, wherein the second resin layer has a thickness of about 20 micrometers.

9. The display module according to claim 3, wherein a liquid storage tank is provided at a bottom of each circular-arc groove.

10. The display module according to claim 3, wherein a first electrode is provided in each of the circular-arc protrusions; and a second electrode is provided in a bottom of each of the liquid storage tanks.

11. The display module according to claim 3, wherein two adjacent liquid storage tanks are communicated with each other.

12. The display module according to claim 2, wherein the plurality of accommodation spaces are communicated at the first surface of the lower substrate; and the bottoms of the plurality of circular-arc grooves are communicated with each other.

13. The display module according to claim 1, wherein the plurality of accommodation spaces are spaced apart from each other.

14. An electronic device, comprising a display module, wherein the display module comprises:
  an upper substrate comprising a glass plate layer, a first resin layer, a first electrode, and a plurality of protrusions arranged in a matrix at a first surface of the upper substrate;
  a lower substrate comprising a second electrode provided thereon, and a plurality of grooves arranged at the first surface of the lower substrate; and
  an inverted emulsion includes charged particles and uncharged liquid;
  wherein the first surface of the upper substrate is on the first surface of the lower substrate, and each of the protrusions is cooperated with a corresponding groove to form an accommodation space, and the inverted emulsion is filled in the accommodation space; and
  refractive indexes of the charged particles in the inverted emulsion, the first resin layer, and the uncharged liquid in the inverted emulsion are decreased sequentially.

15. The display module according to claim 4, wherein each hemispherical protrusion has a diameter of about 20 micrometers.

16. The display module according to claim 15, wherein the circular-arc protrusions are provided on a surface of the first resin layer and are an integral structure with the first resin layer; and
  the lower substrate comprises a non-transparent substrate layer and a second resin layer, the circular-arc grooves are provided at the surface of the second resin layer and are an integral structure with the second resin layer.

17. The display module according to claim 1, wherein a first electrode is provided in each of the circular-arc protrusions; and a second electrode is provided in a bottom of each of the liquid storage tanks.

18. The display module according to claim 17, wherein two adjacent liquid storage tanks are communicated with each other.

* * * * *